US011657345B2

(12) United States Patent
Hatfield et al.

(10) Patent No.: US 11,657,345 B2
(45) Date of Patent: May 23, 2023

(54) IMPLEMENTING MACHINE LEARNING TO IDENTIFY, MONITOR AND SAFELY ALLOCATE RESOURCES TO PERFORM A CURRENT ACTIVITY

(71) Applicant: International Business Machines Corporation, Armonk, NY (US)

(72) Inventors: Jennifer M. Hatfield, San Francisco, CA (US); Jill S. Dhillon, Laguna Niguel, CA (US); Michael Bender, Rye Brook, NY (US); Stan Kevin Daley, Atlanta, GA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 17/210,790

(22) Filed: Mar. 24, 2021

(65) Prior Publication Data
US 2022/0309425 A1    Sep. 29, 2022

(51) Int. Cl.
*G06Q 10/0631* (2023.01)
*G06N 20/00* (2019.01)
(Continued)

(52) U.S. Cl.
CPC ....... *G06Q 10/06313* (2013.01); *G06N 20/00* (2019.01); *G06Q 10/067* (2013.01);
(Continued)

(58) Field of Classification Search
None
See application file for complete search history.

(56) References Cited

U.S. PATENT DOCUMENTS 8,140,369 B2    3/2012 Paul
8,942,662 B2    1/2015 Pan
(Continued)

FOREIGN PATENT DOCUMENTS

WO    WO-2017163251 A2 *    9/2017    ............ B25J 9/1676
WO    WO-2019243798 A1 *    12/2019    ............. B23P 21/00

OTHER PUBLICATIONS

Mohd et al. A survey on resource allocation and monitoring in cloud computing. International Journal of Machine Learning and Computing 4, n1 Feb. 1, 2014 (Year: 2014).*
(Continued)

*Primary Examiner* — Octavian Rotaru
(74) *Attorney, Agent, or Firm* — Michael O'Keefe

(57) ABSTRACT

In an approach to resource monitoring and allocation recommendation, a computer determines a work activity for a risk assessment. A computer determines one or more resources assigned to the work activity. A computer determines one or more current activities associated with the one or more resources assigned to the work activity. Based on the one or more resources assigned to the work activity and on the one or more current activities associated with the one or more resources assigned to the work activity, a computer determines a confidence level associated with successful completion of the work activity. A computer determines the confidence level does not exceed a pre-defined threshold. A computer determines one or more resource scenarios to improve the confidence level. A computer ranks the one or more resource scenarios. A computer generates a resource allocation recommendation based on the ranked one or more resource scenarios.

9 Claims, 3 Drawing Sheets

(51) Int. Cl.
*G06Q 10/067* (2023.01)
*G06Q 10/0635* (2023.01)
*G06Q 10/10* (2023.01)

(52) U.S. Cl.
CPC .. *G06Q 10/0635* (2013.01); *G06Q 10/063112* (2013.01); *G06Q 10/063114* (2013.01); *G06Q 10/063118* (2013.01); *G06Q 10/103* (2013.01)

(56) References Cited

U.S. PATENT DOCUMENTS

| | | | |
|---|---|---|---|
| 2004/0138902 A1 | 7/2004 | Baca | |
| 2010/0256903 A1* | 10/2010 | Johnson | G01C 21/3415 701/533 |
| 2013/0325536 A1 | 12/2013 | Podlaseck | |
| 2016/0231136 A1* | 8/2016 | Hoch | G01C 21/3685 |
| 2017/0021501 A1* | 1/2017 | Kimoto | B25J 9/1671 |
| 2017/0185944 A1* | 6/2017 | Volkov | G06Q 30/0185 |
| 2017/0236081 A1 | 8/2017 | Grady Smith | |
| 2017/0264501 A1* | 9/2017 | Mathen | H04L 41/14 |
| 2018/0129192 A1* | 5/2018 | Murakami | G06Q 50/04 |
| 2018/0288182 A1* | 10/2018 | Tong | G06V 20/597 |
| 2019/0311313 A1* | 10/2019 | Hanoun | G06Q 10/06398 |
| 2019/0370817 A1* | 12/2019 | Uysal | G06Q 30/018 |
| 2020/0043574 A1* | 2/2020 | Mehrotra | G06Q 30/04 |
| 2020/0151575 A1* | 5/2020 | Cabrera Arevalo | G06N 3/084 |
| 2020/0210931 A1* | 7/2020 | Idan | G06Q 10/02 |
| 2021/0065063 A1* | 3/2021 | Gazzetti | G06N 5/04 |
| 2021/0192413 A1* | 6/2021 | Shirazipour | G06T 19/006 |
| 2021/0274004 A1* | 9/2021 | Kumar | H04L 67/12 |
| 2021/0314282 A1* | 10/2021 | Sharma | H04L 65/65 |
| 2021/0365434 A1* | 11/2021 | Kim | G06F 16/2365 |
| 2021/0392171 A1* | 12/2021 | Srinivas | G06N 5/047 |

OTHER PUBLICATIONS

Thermal Exposure Sensor for Fire Fighters—Laboratory-Scale Performance Experiments, NIST Technical Note 1803, Jul. 2016 https://www.nist.gov/publications/thermal-exposure-sensor-fire-fighters-laboratory-scale-performance-experiments (Year: 2016).*

Willi et al, Characterizing a firefighter immediate thermal environment in live-fire training scenarios, Fire Technology, 52, 1667-96, Nov. 2016 https://link.springer.com/article/10.1007/BF02303057 (Year: 2016).*

Reischl et al, A heat stress monitoring system for fire fighters, Fire Technology, 13, 121-5, May 1977 https://link.springer.com/article/10.1007/BF02303057 (Year: 1977).*

IBM, "IBM ILOG CPLEX Optimization Studio", IBM, Accessed on Jan. 20, 2021, 3 Pages.

* cited by examiner

IMPLEMENTING MACHINE LEARNING TO IDENTIFY, MONITOR AND SAFELY ALLOCATE RESOURCES TO PERFORM A CURRENT ACTIVITY

BACKGROUND OF THE INVENTION

The present invention relates generally to the field of machine learning, and more particularly to resource monitoring and allocation recommendation.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. Machine learning explores the study and construction of algorithms that can learn from and make predictions based on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to prediction. These analytical models allow researchers, data scientists, engineers, and analysts to produce reliable, repeatable decisions and results and to uncover hidden insights through learning from historical relationships and trends in the data.

SUMMARY

Embodiments of the present invention disclose a computer-implemented method, a computer program product, and a system for resource monitoring and allocation recommendation. The computer-implemented method may one or more computer processors determining a work activity for a risk assessment. One or more computer processors determine one or more resources assigned to the work activity. One or more computer processors determine one or more current activities associated with the one or more resources assigned to the work activity. Based on the one or more resources assigned to the work activity and on the one or more current activities associated with the one or more resources assigned to the work activity, one or more computer processors determine a confidence level associated with successful completion of the work activity. One or more computer processors determine the confidence level does not exceed a pre-defined threshold. One or more computer processors determine one or more resource scenarios to improve the confidence level. One or more computer processors rank the one or more resource scenarios. One or more computer processors generate a resource allocation recommendation based on the ranked one or more resource scenarios.

DETAILED DESCRIPTION

For occupations that require special skill sets or a specific physical attribute to be most safe and effective. there are certain parameters measured for the position to be the right fit for the worker. Additionally, these parameters apply to safe operation and functioning of equipment. Industries with field work, among others, have a need for a worker to be aligned with the requirements for performance on the job. Based on needs and functional requirements for operational activities, there is also a need to understand how many workers and which types of skill sets may be needed over the life of an activity or project to complete tasks associated with the activity and mitigate risk of underperformance or failure over a long period of time.

Embodiments of the present invention recognize that efficiency may be gained by implementing a system to map the right worker with the right activity based on skill set and equipment requirements. Embodiments of the present invention also recognize that long term improvements may be made by matching and predicting for longevity and aptitude of personnel based on the type of activity and other situational factors. Embodiments of the present invention maximize the safety of human resources and worksite conditions and completion of the activity, based on a cognitive analysis of current and future conditions. Implementation of embodiments of the invention may take a variety of forms, and exemplary implementation details are discussed subsequently with reference to the Figures.

Figure 1:
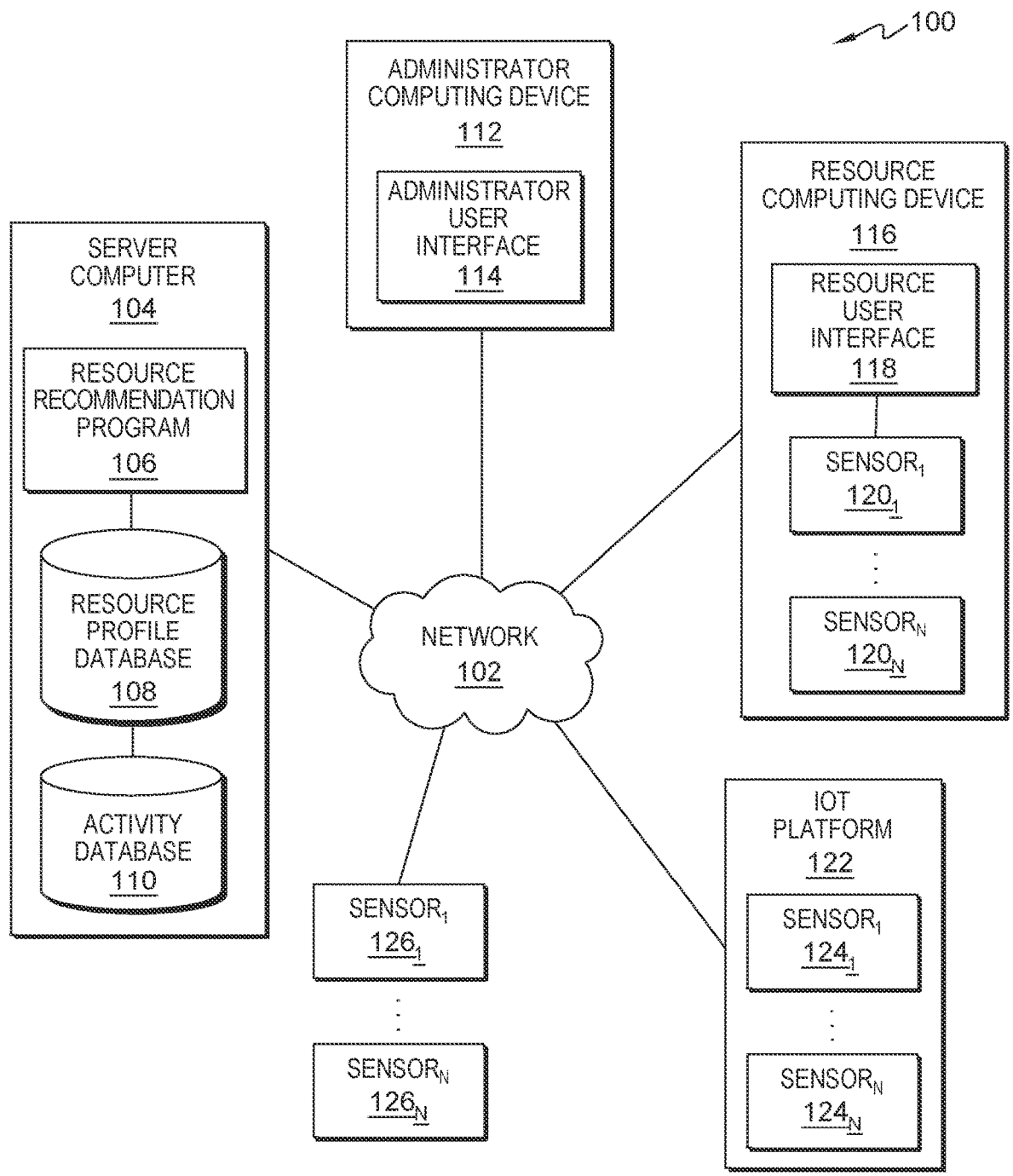
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, administrator computing device 112, resource computing device 116, Internet of Things (IoT) platform 122, and sensor $126_{1-N}$, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, administrator computing device 112, resource computing device 116, IoT platform 122, sensor $126_{1-N}$, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with administrator computing device 112, resource computing device 116, IoT platform 122, sensor $126_{1-N}$, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes resource recommendation program 106, resource profile database 108, and activity database 110. Server computer 104 may include internal and external hardware components, as depicted and described in further detail with respect to FIG. 3.

Resource recommendation program 106 manages resource allocation to optimize activity outcomes based on cognitive analysis of current and future conditions. Resource recommendation program 106 determines an activity for which a risk assessment is needed. Resource recommendation program 106 determines available resources as well as currently assigned resources. Resource recommendation program 106 determines current and future activities associated with the resources. Resource recommendation program 106 determines a confidence level associated with completing the activity. If resource recommendation program 106 determines the confidence level does not exceed a pre-defined threshold, then resource recommendation program 106 determines one or more new resource scenarios. Resource recommendation program 106 ranks the scenarios and generates a recommendation for resource allocation. Resource recommendation program 106 monitors the activity to completion and may generate additional recommendations based on resource status as the activity progresses. Resource recommendation program 106 is depicted and described in further detail with respect to FIG. 2.

Resource profile database 108 and activity database 110 each store information used by and/or generated by resource recommendation program 106. In the depicted embodiment, resource profile database 108 and activity database 110 reside on server computer 104. In another embodiment, resource profile database 108 and activity database 110 may each reside elsewhere within distributed data processing environment 100, provided that resource recommendation program 106 has access to resource profile database 108 and activity database 110. A database is an organized collection of data. Resource profile database 108 and activity database 110 can each be implemented with any type of storage device capable of storing data and configuration files that can be accessed and utilized by resource recommendation program 106, such as a database server, a hard disk drive, or a flash memory. Resource profile database 108 represents one or more databases that store profiles of resources, both human and physical, that perform tasks for which resource recommendation program 106 recommends resource allocation. A profile for a human resource can include, but is not limited to, skills, work history, work evaluations, education, and physical attributes and/or constraints. A profile for a physical resource can include, but is not limited to, a manufacturer, a model number, a date the resource went into service, a service type, a service capacity, warranty information, a maintenance record, etc. Activity database 110 represents one or more databases that store project plans and/or lists of activities and tasks that need to be performed within an enterprise in the future. Activity database 110 also stores activity histories, which may include, but are not limited to, which resources performed the activity, performance level, whether the activity was completed on schedule, whether the activity was completed within budget, tasks within the activity, etc. Activity database 110 may also store information associated with the location or environment in which an activity takes place. For example, activity database 110 may store blueprints, floor plans, maps, data associated with the construction of the location, data associated with a climate control system of the location, historical weather conditions, etc.

The present invention may contain various accessible data sources, such as resource profile database 108 and activity database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Resource recommendation program 106 enables the authorized and secure processing of personal data. Resource recommendation program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Resource recommendation program 106 provides information regarding personal data and the nature (e.g., type, scope, purpose, duration, etc.) of the processing. Resource recommendation program 106 provides the user with copies of stored personal data. Resource recommendation program 106 allows the correction or completion of incorrect or incomplete personal data. Resource recommendation program 106 allows the immediate deletion of personal data.

Administrator computing device 112 and resource computing device 116 can each be one or more of a laptop computer, a tablet computer, a smart phone, smart watch, a smart speaker, or any programmable electronic device capable of communicating with various components and devices within distributed data processing environment 100, via network 102. Administrator computing device 112 and resource computing device 116 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, administrator computing device 112 and/or resource computing device 116 may be integrated into a vehicle of the user. For example, administrator computing device 112 and resource computing device 116 may each include a heads-up display in the windshield of the vehicle. In general, administrator computing device 112 and resource computing device 116 each represents one or more programmable electronic devices or combination of programmable electronic devices capable of executing machine readable program instructions and communicating with other computing devices (not shown) within distributed data processing environment 100 via a network, such as network 102. Administrator computing device 112 includes an instance of administrator user interface 114. Resource computing device 116 includes an instance of resource user interface 118 and sensor $120_{1-N}$.

Administrator user interface 114 provides an interface between resource recommendation program 106 on server computer 104 and a user of administrator computing device 112. Resource user interface 118 provides an interface between resource recommendation program 106 on server computer 104 and a user of resource computing device 116. In one embodiment, administrator user interface 114 and/or resource user interface 118 are mobile application software. Mobile application software, or an "app," is a computer program designed to run on smart phones, tablet computers and other mobile devices. In one embodiment, administrator user interface 114 and/or resource user interface 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Administrator user interface 114 enables a user of administrator computing device 112 to provide input regarding activities that need to be scheduled and performed, including an objective of an activity. Administrator user interface 114 also enables a user of administrator computing device 112 to receive a recommendation for resource allocation from resource recommendation program 106. In addition, administrator user interface 114 enables a user of administrator computing device 112 to input profile information associated with one or more physical resources. Resource user interface 118 enables a user of resource computing device 116 to input profile information for storage in resource profile database 108.

Internet of things (IoT) platform 122 is a suite of components that enable a) deployment of applications that monitor, manage, and control connected devices and sensors; b) remote data collection from connected devices; and c) independent and secure connectivity between devices. The components may include, but are not limited to, a hardware architecture, an operating system, and/or a runtime library (not shown). In the depicted embodiment, IoT platform 122 includes sensor $124_{1-N}$. In another embodiment, IoT platform 122 may include a plurality of other connected computing devices. For example, IoT platform 122 may include security devices, such as alarms, smoke detectors, and video doorbells. In another example, IoT platform 122 may include a climate control system or various appliances. In yet another example, IoT platform 122 may include a virtual assistant. In an embodiment, one or more devices included in IoT platform 122 may include a machine learning component that can learn a user's preferences over time by observing the user's actions. For example, an intelligent home climate control system may detect a pattern such as the user setting a thermostat for 65 degrees Fahrenheit in the mornings on Monday through Friday, when the user is not at home, and adjusting the thermostat to 70 degrees Fahrenheit for the rest of the time. Based on this pattern, the IoT device can set the thermostat without user intervention.

Sensor $120_{1-N}$, sensor $124_{1-N}$, and sensor $126_{1-N}$, hereinafter sensor(s) 120, sensor(s) 124, and sensor(s) 126, detect a plurality of attributes of a user of resource computing device 116 and of the environment of the user. As used herein, N represents a positive integer, and accordingly the number of scenarios implemented in a given embodiment of the present invention is not limited to those depicted in FIG. 1. A sensor is a device that detects or measures a physical property and then records or otherwise responds to that property, such as vibration, chemicals, radio frequencies, environment, weather, humidity, light, etc. Sensor(s) 120, sensor(s) 124, and sensor(s) 126 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 120, sensor(s) 124, and sensor(s) 126 include any device capable of imaging a portion of the electromagnetic spectrum. If resource computing device 116 is a wearable device, then sensor(s) 120 may include biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography data, body temperature, eye tracking data, etc. Sensor(s) 120, sensor(s) 124, and sensor(s) 126 may be one or more of a plurality of types of microphone for detecting speech and other audible sounds. Sensor(s) 120, sensor(s) 124, and sensor(s) 126 may be one or more of a plurality of types of gyroscopic sensors, or other sensors, that can detect movement. Sensor(s) 120, sensor(s) 124, and sensor(s) 126 may be one or more of a plurality of types of pressure sensors. Sensor(s) 120, sensor(s) 124, and sensor(s) 126 may be able to detect environmental and/or weather conditions, such as air temperature, relative humidity, presence and type of precipitation, wind speed, etc., as the ability to perform an activity may depend on environmental conditions. Sensor(s) 120 and sensor(s) 124 may be global positioning system (GPS) sensors, beacons, and/or Bluetooth® sensors that can detect geo-location or movement of one or more users. Sensor(s) 120, sensor(s) 124, and sensor(s) 126 may also be one or more of a plurality of types of near-field communications sensors. Sensor(s) 124 and sensor(s) 126 may be integrated into a physical space. For example, sensor(s) 124 and/or sensor(s) 126 may be occupancy sensors. Sensor(s) 120, sensor(s) 124 and/or sensor(s) 126 may be able to detect Wi-Fi® signals. In the depicted embodiment, sensor(s) 126 communicate via network 102. In another embodiment, sensor(s) 126 may communicate directly to resource computing device 116.

Figure 2:
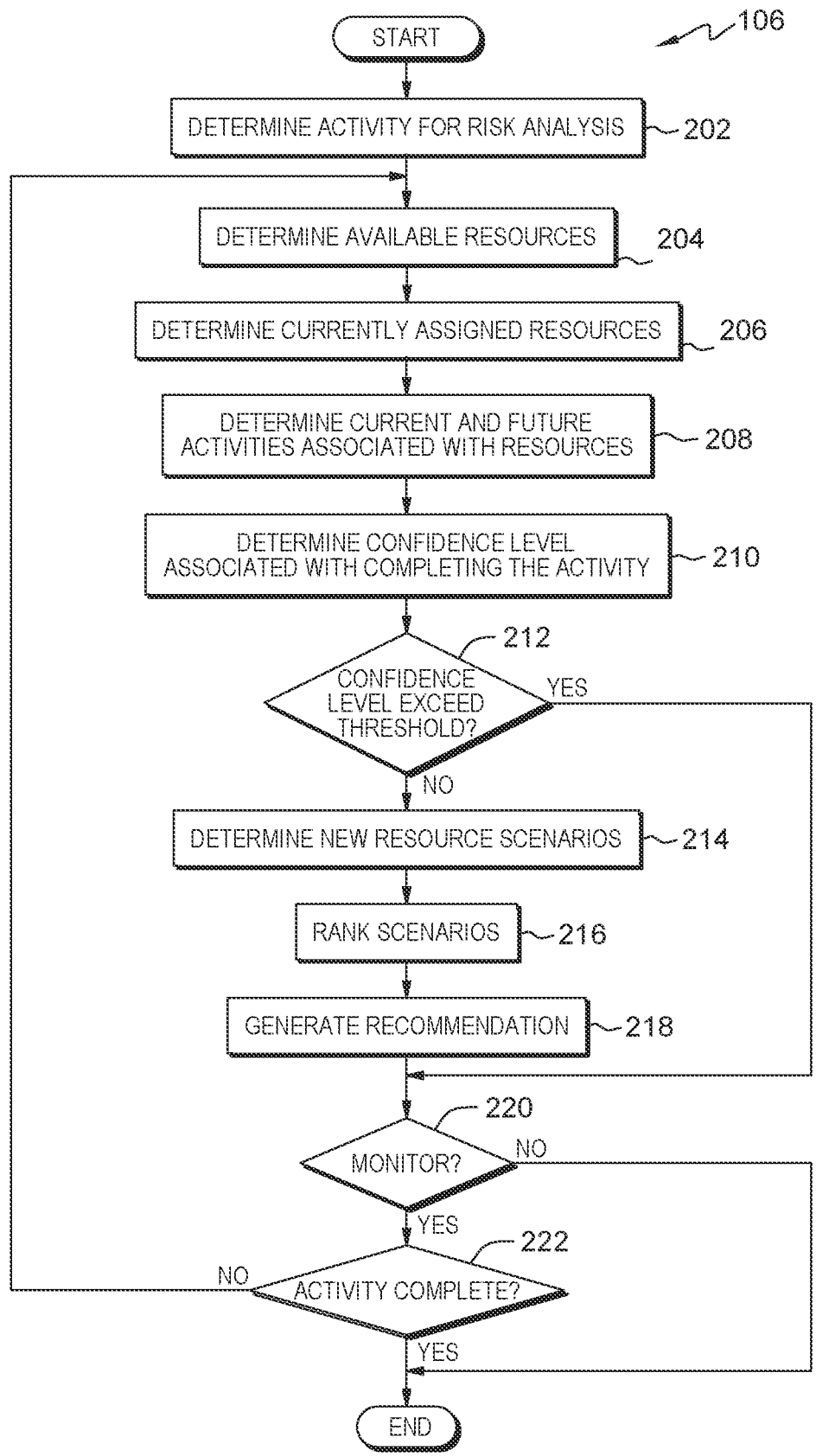
FIG. 2 is a flowchart depicting operational steps of a resource recommendation program, on a server computer within the distributed data processing environment of FIG. 1, for resource monitoring and allocation recommendation, in accordance with an embodiment of the present invention.

FIG. 2 is a flowchart depicting operational steps of resource recommendation program 106, on server computer 104 within distributed data processing environment 100 of FIG. 1, for resource monitoring and allocation recommendation, in accordance with an embodiment of the present invention.

Resource recommendation program 106 determines an activity for risk analysis (step 202). In an embodiment, as a trigger to starting a process for generating a resource allocation recommendation from a risk analysis, resource recommendation program 106 determines a current work activity for which to perform the risk analysis. In one embodiment, resource recommendation program 106 receives the work activity from a user of administrator computing device 112, via administrator user interface 114. In an embodiment where resource recommendation program 106 automatically iterates through each activity in a project plan, resource recommendation program 106 retrieves the project plan from activity database 110 and determines the next activity for which a risk analysis is needed. An activity may comprise one or more tasks. For example, an activity may be climbing an electrical pole to fix broken wiring. In another example, an activity may be installing a roof, which includes both a high-pitched roofing task and a standard pitch roofing task. In an embodiment, resource recommendation program 106 determines the length, or duration, of the activity to be started or completed. In an embodiment, resource recommendation program 106 determines any equipment operation safety and/or certification requirements for the current activity. In an embodiment, a user of administrator computing device 112 stores an objective of the current activity in activity database 110. The objective may include one or more of a schedule, a deadline, a budget, a specified number of resources, etc.

Resource recommendation program 106 determines available resources (step 204). In an embodiment, resource recommendation program 106 retrieves information regarding both human and physical resources available for performing the current activity. In an embodiment, resource recommendation program 106 retrieves information regarding available resources from a pool of resources stored in resource profile database 108. In an embodiment, available human resources are those resources with skills associated with the current task. In an embodiment, human resources considered unavailable may be those resources with physical attributes or constraints that prohibit the resources from performing the current activity. For example, a resource unable to lift 50 pounds is not available for an activity that requires the resource to perform heavy lifting.

Resource recommendation program 106 determines currently assigned resources (step 206). In an embodiment, resource recommendation program 106 retrieves activity data from activity database 110 to determine which human and physical resources are currently assigned to one or more activities. Resource recommendation program 106 may determine which of the resources are assigned to the current activity and/or to another activity associated with a project within the enterprise. In an embodiment, resource recommendation program 106 receives current assignments of resources from the user of administrator computing device 112, via administrator user interface 114. In an embodiment, resource recommendation program 106 determines currently assigned resources by monitoring activity of the resources. For example, by monitoring one or more of sensor(s) 120 that include GPS sensors, resource recommendation program 106 may determine that a human resource is in a geolocation of a current project. In another example, by monitoring one or more of sensor(s) 124 that include a camera, resource recommendation program 106 may determine that a physical resource, such as manufacturing equipment, is in motion. In an embodiment, currently assigned resources are assigned to an activity scheduled to occur at a time in the future.

Resource recommendation program 106 determines current and future activities associated with resources (step 208). In an embodiment, for each available resource, resource recommendation program 106 determines scheduling of current activities. For example, resource recommendation program 106 determines current activities by retrieving activity data from activity database 110. In another example, resource recommendation program 106 may determine current activities by receiving scheduling information from the user of administrator computing device 112, via administrator user interface 114. In yet another example, resource recommendation program 106 may determine current activities by monitoring sensor(s) 120, sensor(s) 124, and/or sensor(s) 126. In an embodiment, resource recommendation program 106 also determines future activities of each resource. For example, resource recommendation program 106 retrieves activity data from activity database 110 that indicates a planned activity requires certain skills. Resource recommendation program 106 can map the required skills to the skills of the available resources to predict which resources will be assigned to the future activity. In another example, resource recommendation program 106 determines future activities based on one or more metrics, such as time to completion, effort level, and compatibility factors to predict a quantity of resources that will be assigned to future activities. In the example, resource recommendation program 106 may also compare current efforts to historical data of the same or similar activity utilizing machine learning to educate the determination. In yet another example, resource recommendation program 106 may determine future activities by receiving scheduling information from the user of administrator computing device 112, via administrator user interface 114.

Determining current and future activities associated with the resources may be dependent on capturing the physical environment of the activities. For example, if the activity is planned to be outdoors, then resource recommendation program 106 can use data from sensor(s) 124 and/or sensor(s) 126 to determine current environmental and weather conditions. If, for example, the temperature is too low or precipitation is falling, then the activity may have to be postponed until conditions are safe to perform an activity such as roofing. In another example, resource recommendation program 106 may determine the current location of a resource, via sensor(s) 120, sensor(s) 124 and/or sensor(s) 126. The current location of a resource may impact the ability of the resource to perform the activity. If the resource is located near the location that the current activity is to be performed, then the resource is a good candidate for the current activity.

Resource recommendation program 106 determines a confidence level associated with completing the activity (step 210). In an embodiment, based on the available resources, the currently assigned resources, and the current and future activities associated with resources, resource recommendation program 106 performs a risk analysis to calculate a confidence level associated with completing the activity to meet the stated objective. If the current activity has not yet begun, then resource recommendation program 106 determines requirements of the activity, such as a number of human resources required with one or more specific skills, a type of physical resource required, a status of the location where the activity will be performed, a schedule or deadline associated with the activity, etc. In an embodiment, resource recommendation program 106 determines the activity requirements by retrieving historical data from activity database 110 associated with a similar activity. In an embodiment, resource recommendation program 106 may also retrieve data from one or more other sources, not shown in FIG. 1, such as equipment manuals and weather forecasts. In another embodiment, resource recommendation program 106 determines the activity requirements when a user of administrator computing device 112 inputs the requirements, via administrator user interface 114. If the current activity has already begun, then resource recommendation program 106 determines the activity requirements based on the status of the activity and the resources already assigned. For example, resource recommendation program 106 may assess a maintenance status of a physical resource via data received from sensor(s) 124 and/or sensor(s) 126. In another example, resource recommendation program 106 may assess a health status of a human resource, via data received from sensor(s) 120, sensor(s) 124 and/or sensor(s) 126. Then, resource recommendation program 106 assesses the availability of resources and location conditions that match the requirements. Based on the assessment, resource recommendation program 106 determines a level of confidence that the current activity will be successfully completed. In an embodiment, resource recommendation program 106 uses machine learning from completion of similar activities in the past to determine the confidence level in completion of the current activity.

Resource recommendation program 106 determines whether the confidence level exceeds a threshold (decision block 212). In an embodiment, a user of administrator computing device 112 sets a pre-defined threshold that the calculated confidence level must exceed to indicate that the current activity is likely to be successfully completed. In the embodiment, the user of administrator computing device 112 stores the threshold in activity database 110, via administrator user interface 114. In another embodiment, resource recommendation program 106 determines a confidence level threshold via machine learning techniques, using historical data of the success and failure of previous activities.

If resource recommendation program 106 determines the confidence level does not exceed the threshold ("no" branch, decision block 212), then resource recommendation program 106 determines new resource scenarios (step 214). In an embodiment, starting with the current state and risks of the current activity requirements, resource recommendation program 106 evaluates a plurality of permutations of resource allocation strategies to fulfill the stated objective of the current activity and increase the confidence level of completion of the activity. In an embodiment, resource recommendation program 106 determines the best resource for the current activity based on set parameters that may include the complexity of the activity and/or equipment operation. In an embodiment, resource recommendation program 106 also determines a confidence level associated with each of the scenarios. In an embodiment where the activity is already in progress, resource recommendation program 106 evaluates one or more changes to the current resource allocation that would increase the confidence level of completion of the activity. For example, resource recommendation program 106 may evaluate a scenario that increases the number of resources assigned to the current activity in order to speed up progress to meet a deadline. In another example, resource recommendation program 106 may evaluate switching a resource assignment from a resource with a history of mediocre work skills, retrieved from resource profile database 108, to a resource with a history of efficient work skills in order to speed up progress to meet a deadline.

Resource recommendation program 106 ranks the scenarios (step 216). In an embodiment, resource recommendation program 106 ranks the scenarios by the respective level of confidence for the scenario to result in successful completion of the current activity. In another embodiment, resource recommendation program 106 ranks the scenarios based on one or more other criteria. For example, resource recommendation program 106 may include in the ranking any risk determined for the health or safety of a resource in a particular scenario. In another example, resource recommendation program 106 may include in the ranking a risk of weather impacting the successful completion of the current activity.

Resource recommendation program 106 generates a recommendation (step 218). In an embodiment, based on the top ranked one or more scenarios, resource recommendation program 106 generates a recommendation for resource allocation to reduce the risk of not meeting the stated objective of the current activity. If the current activity has not yet begun, then resource recommendation program 106 generates a recommendation for an optimum resource allocation. If the current activity is already in progress, then resource recommendation program 106 generates a recommendation that includes one or more changes to the current resource allocation. In an embodiment, resource recommendation program 106 transmits the generated recommendation to the user of administrator computing device 112 via administrator user interface 114. In another embodiment, resource recommendation program 106 stores the recommendation in activity database 110 such that the user of administrator computing device 112 can retrieve the recommendation. In an embodiment, if the user of administrator computing device 112 chooses a resource allocation from the generated recommendation, via administrator user interface 114, then resource recommendation program 106 receives an updated allocation.

In an embodiment, generating a recommendation includes assessing meteorological, geographical, and/or regional overlays that may impact which resources resource recommendation program 106 recommends for an activity. For example, based on data from resource profile database 108, resource recommendation program 106 may determine that some resources do not work well in an extremely hot or cold temperature environment, while other resources have a higher tolerance for extreme temperatures that are unique to certain times of the year, weather patterns, or regional anomalies.

Responsive to generating a recommendation, or if resource recommendation program 106 determines the confidence level exceeds the threshold ("yes" branch, decision block 212), then resource recommendation program 106 determines whether to monitor the activity (decision block 220). In an embodiment, resource recommendation program 106 continuously monitors the status of the activity as progress toward the stated objective is achieved. In an embodiment, resource recommendation program 106 determines to monitor the activity based on input from the user of administrator computing device 112. For example, resource recommendation program 106 may prompt the user, via administrator user interface 114, regarding whether or not to monitor the progress of the activity. In another example, the user of administrator computing device 112 may instruct resource recommendation program 106 to monitor the activity in response to receiving the resource allocation recommendation. In another embodiment, resource recommendation program 106 determines to monitor the activity based on the status of the current activity. For example, resource recommendation program 106 may determine to monitor the current activity based on a pre-defined threshold of completeness of the activity, such as, if the activity is less than 80 percent complete. In an embodiment, resource recommendation program 106 determines to monitor an activity if the activity has not yet started. For example, resource recommendation program 106 may monitor all new activities. In an embodiment, resource recommendation program 106 determines to monitor an activity based on historical data of whether resource recommendation program 106 monitored a similar activity in the past.

If resource recommendation program 106 determines to monitor the activity ("yes" branch, decision block 220), then resource recommendation program 106 determines if the activity is complete (decision block 222). In an embodiment, resource recommendation program 106 determine whether the current activity is complete based on data received from sensor(s) 120, sensor(s) 124, and/or sensor(s) 126. For example, resource recommendation program 106 may determine based on a received image of a roof at the location of the activity that the shingles have all been laid, and therefore the activity is complete. In another embodiment, resource recommendation program 106 determines if the activity is complete based on input from the user of administrator computing device 112, via administrator user interface 114.

If resource recommendation program 106 determines the activity is not complete ("no" branch, decision block 222), then resource recommendation program 106 returns to step 204. In an embodiment, while continuously monitoring the progress of the current activity, resource recommendation program 106 repeats the process of assessing resources and the level of confidence in successful completion of the activity until the activity is complete or until resource recommendation program 106 determines that monitoring is no longer required.

If resource recommendation program 106 determines to not monitor the activity ("no" branch, decision block 220), then resource recommendation program 106 ends execution. If resource recommendation program 106 determines the activity is complete ("yes" branch, decision block 222), then resource recommendation program 106 ends execution.

In an example use case of resource recommendation program 106, a silver mine has a vein of silver that will last for five years. Resource recommendation program 106 predicts a need for five workers, i.e., human resources, over the life of the vein. Resource recommendation program 106 analyzes the profiles of the available resources in resource profile database 108 and identifies the best resources suited for the activity, which includes one or more physical attributes and/or constraints. If the activity is already in progress and one of the assigned resources drops out, then resource recommendation program 106 can identify the next best resource from the pool of available resources to fill the gap.

In another example use case of resource recommendation program 106, an activity of replacing utility poles and towers is planned. A specific skill set is required for the resources needed to perform the activity, such as the ability to work in a rural, mountainous area over a period of years, as well as an ability to climb utility poles and use a lift to reach heights on electrical towers and wires. Resource recommendation program 106 identifies a best set of resources with the required skill set. In addition, resource recommendation program 106 predicts the duration of resources staying in the position based on factors of physicality, historical endurance samples, environmental factors, and similar tasks performed in the past. Resource recommendation program 106 estimates a requirement for five workers rotating in an out of the assignment over a three-year period. With only three suitable resources in the current pool of available resources, resource recommendation program 106 generates a recommendation to hire an additional two resources.

Figure 3:
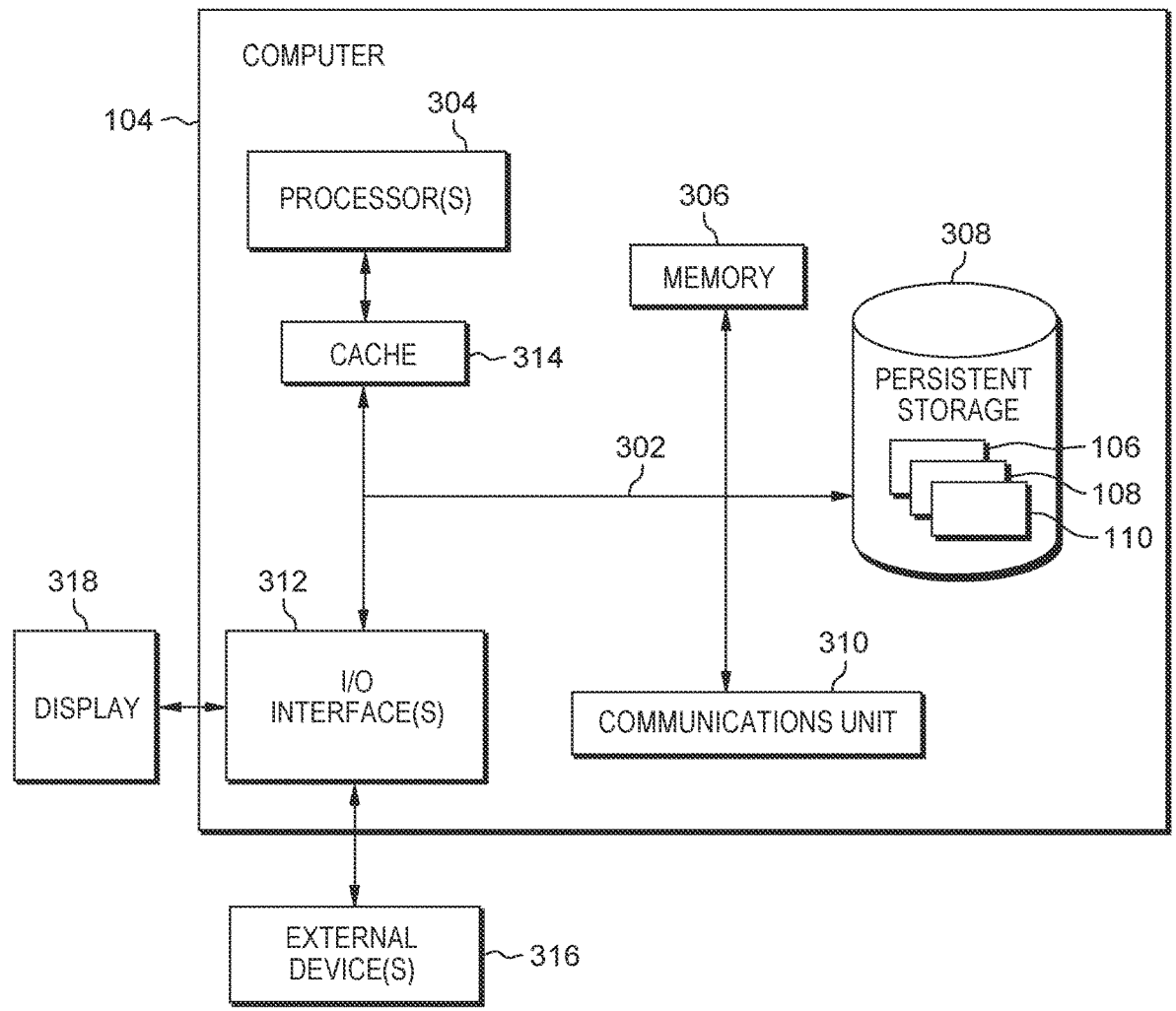
FIG. 3 depicts a block diagram of components of the server computer executing the resource recommendation program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., resource recommendation program 106, resource profile database 108, and activity database 110 are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of administrator computing device 112, resource computing device 116, IoT platform 122, and sensor $126_{1-N}$. In these examples, communications unit 310 includes one or more network interface cards. Communications unit 310 may provide communications through the use of either or both physical and wireless communications links. Resource recommendation program 106, resource profile database 108, and activity database 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., resource recommendation program 106, resource profile database 108, and activity database 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for implementing machine learning in identifying and safely allocating resources to perform a current activity, the computer implemented method comprising:
   deploying, on an internet of things platform, a plurality of interconnected sensors comprising: a biometric sensor for detecting a physical condition of a resource, a GPS enabled sensor for identifying a location of the resource, and an air temperature sensor for measuring a current air temperature of an environment in which the resource is located;
   determining, by a resource recommendation program executed by one or more hardware processors and coupled to the internet of things platform via a multimedia network, requirements for completing a current activity comprising: required skills, a location where the current activity will be performed, and a deadline associated with completing the current activity;
   determining, by the resource recommendation program, respective availability and location of a plurality of resources;
   mapping, by the resource recommendation program, the required skills to those skills of the available resources, to predict that the resource among the available resources will be assigned to the current activity;
   identifying, using the GPS enabled sensor, that the resource is located near the current activity and is able to perform the current activity;
   measuring and recording, by the air temperature sensor, the current air temperature of the environment in which the resource is located;
   assessing, by the resource recommendation program, a health status of the resource via the plurality of sensors;
   predicting, by the resource recommendation program, a duration of the resource staying at the location of the resource based on physicality factors, historical endurance samples, environmental factors and previously performed similar activities;
   determining, by the resource recommendation program using the air temperature sensor, that the resource does not work well in the environment with the current air temperature;
   determining, using machine learning, by the resource recommendation program, that a confidence level of the resource in completing the current activity when compared to the previously performed similar activities does not exceed a pre-determined confidence level;
   postponing the current activity in the environment, until the current air temperature of the environment is determined safe to perform the current activity;
   evaluating, by the resource recommendation program, a plurality of permutations of the plurality of available resources according to a work history of the plurality of available resources, to identify allocation scenarios for additional resources, among the plurality of available resources, to be allocated to the resource in order to speed up progress in meeting the deadline and increase the confidence level in completing the current activity;
   ranking, by the resource recommendation program, the allocation scenarios to generate a recommendation for allocating the additional resources to the resource, based on the evaluation, the determined safety, and the health status of the resource as the current activity progresses.

2. The computer implemented method of claim 1, wherein the additional resources comprise: at least one of a human resource and a physical resource.

3. The computer implemented method of claim 1, further comprising:
   determining, by the resource recommendation program, one or more future activities associated with the plurality of available resources.

4. A system for implementing machine learning in identifying and safely allocating resources to perform a current activity, the system comprising:
   one or more hardware processors;
   an internet of things platform, configure to enable:
      deploying, a plurality of interconnected sensors comprising: a biometric sensor for detecting a physical condition of a resource, a GPS enabled sensor for identifying a location of the resource, and an air temperature sensor for measuring a current air temperature of an environment in which the resource is located;
   a resource recommendation program executed by the one or more hardware processors and coupled to the internet of things platform via a multimedia network, for:
      determining, requirements for completing a current activity comprising:
      required skills, a location where the current activity will be performed, and a deadline associated with completing the current activity;
      determining, respective availability and location of a plurality of resources;

mapping, the required skills to those skills of the available resources, to predict that the resource among the available resources will be assigned to the current activity;

identifying, using the GPS enabled sensor, that the resource is located near the current activity and is able to perform the current activity;

measuring and recording, using the air temperature sensor, the current air temperature of the environment in which the resource is located;

assessing, a health status of the resource via the plurality of sensors;

predicting, a duration of the resource staying at the location of the resource based on physicality factors, historical endurance samples, environmental factors and previously performed similar activities;

determining, using the air temperature sensor, that the resource does not work well in the environment with the current air temperature;

determining, using machine learning, that a confidence level of the resource in completing the current activity when compared to the previously performed similar activities does not exceed a pre-determined confidence level;

postponing the current activity in the environment, until the current air temperature of the environment is determined safe to perform the current activity;

evaluating, a plurality of permutations of the plurality of available resources according to a work history of the plurality of available resources, to identify allocation scenarios for additional resources, among the plurality of available resources, to be allocated to the resource in order to speed up progress in meeting the deadline and increase the confidence level in completing the current activity;

ranking, the allocation scenarios to generate a recommendation for allocating the additional resources to the resource, based on the evaluation, the determined safety, and the health status of the resource as the current activity progresses.

5. The system of claim 4, wherein the additional resources comprise: at least one of a human resource and a physical resource.

6. The system claim 4, wherein the resource recommendation program is further executed by the one or more hardware processors for:
determining, one or more future activities associated with the plurality of available resources.

7. A computer program product comprising: a computer readable storage medium and program instructions collectively stored on the computer readable storage medium and executed by one or more hardware processors for:
deploying, on an internet of things platform, a plurality of interconnected sensors comprising: a biometric sensor for detecting a physical condition of a resource, a GPS enabled sensor for identifying a location of the resource, and an air temperature sensor for measuring a current air temperature of an environment in which the resource is located;

determining, using a resource recommendation program coupled to the internet of things platform via a multimedia network, requirements for completing a current activity comprising: required skills, a location where the current activity will be performed, and a deadline associated with completing the current activity;

determining, using the resource recommendation program, respective availability and location of a plurality of resources;

mapping, using the resource recommendation program, the required skills to those skills of the available resources, to predict that the resource among the available resources will be assigned to the current activity;

identifying, using the GPS enabled sensor, that the resource is located near the current activity and is able to perform the current activity;

measuring and recording, using the air temperature sensor, the current air temperature of the environment in which the resource is located;

assessing, using the resource recommendation program, a health status of the resource via the plurality of sensors;

predicting, using the resource recommendation program, a duration of the resource staying at the location of the resource based on physicality factors, historical endurance samples, environmental factors and previously performed similar activities;

determining, using the air temperature sensor, that the resource does not work well in the environment with the current air temperature;

determining, using machine learning, by the resource recommendation program, that a confidence level of the resource in completing the current activity when compared to the previously performed similar activities does not exceed a pre-determined confidence level;

postponing the current activity in the environment, until the current air temperature of the environment is determined safe to perform the current activity;

evaluating, using the resource recommendation program, a plurality of permutations of the plurality of available resources according to a work history of the plurality of available resources, to identify allocation scenarios for additional resources, among the plurality of available resources, to be allocated to the resource in order to speed up progress in meeting the deadline and increase the confidence level in completing the current activity;

ranking, using the resource recommendation program, the allocation scenarios to generate a recommendation for allocating the additional resources to the resource, based on the evaluation, the determined safety, and the health status of the resource as the current activity progresses.

8. The computer program product of claim 7, wherein the additional resources comprise: at least one of a human resource and a physical resource.

9. The computer program product of claim 7, wherein the instructions are further executed by the one or more hardware processors for:
determining, one or more future activities associated with the plurality of available resources.

* * * * *